(12) United States Patent
Adachi

(10) Patent No.: US 8,300,718 B2
(45) Date of Patent: Oct. 30, 2012

(54) DEMODULATING CIRCUIT, DEMODULATING METHOD, AND RECEIVING SYSTEM

(75) Inventor: Naoto Adachi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 270 days.

(21) Appl. No.: 12/782,018

(22) Filed: May 18, 2010

(65) Prior Publication Data

US 2010/0303163 A1 Dec. 2, 2010

(30) Foreign Application Priority Data

May 29, 2009 (JP) ................................ 2009-130807

(51) Int. Cl.
*H04K 1/10* (2006.01)
*H04L 27/28* (2006.01)

(52) U.S. Cl. ........ 375/260; 375/346; 375/349; 375/371; 375/373; 370/210

(58) Field of Classification Search .................. 375/260, 375/346, 349, 362, 371, 373; 370/210
See application file for complete search history.

(56) References Cited

U.S. PATENT DOCUMENTS

| 7,577,087 | B2 * | 8/2009 | Palin ............................ 370/210 |
| 2007/0070882 | A1 * | 3/2007 | Kawauchi et al. ............ 370/210 |
| 2007/0280364 | A1 | 12/2007 | Adachi |
| 2008/0101490 | A1 * | 5/2008 | Kawauchi et al. ............ 375/260 |
| 2008/0212464 | A1 * | 9/2008 | Kim et al. ..................... 370/210 |
| 2009/0274223 | A1 * | 11/2009 | Jeong ............................ 375/260 |
| 2009/0285086 | A1 * | 11/2009 | Adachi ......................... 370/210 |
| 2009/0285318 | A1 * | 11/2009 | Adachi ......................... 375/260 |
| 2011/0235688 | A1 * | 9/2011 | Umeda ......................... 375/216 |

FOREIGN PATENT DOCUMENTS

| JP | 2007-324905 A | 12/2007 |
| JP | 2008-042574 A | 2/2008 |

* cited by examiner

*Primary Examiner* — Phuong Phu

(74) *Attorney, Agent, or Firm* — Arent Fox LLP

(57) ABSTRACT

A demodulating circuit includes: a fast Fourier transform circuit which fast Fourier transforms a received signal and outputs a plurality of carrier signals; an output selecting circuit which selects at least two signals from the plurality of carrier signals, the at least two signals including a first signal modulated in accordance with a first modulation method and a second signal modulated in accordance with a second modulation method; an inverse fast Fourier transform circuit which inverse Fourier transforms transmission path characteristic values including a first transmission path characteristic value obtained based on the first signal and a second transmission path characteristic value obtained based on the second signal; and an FFT window control circuit which controls a position of an FFT window based on the inverse Fourier transformed transmission path characteristic values.

18 Claims, 12 Drawing Sheets

DEMODULATING CIRCUIT, DEMODULATING METHOD, AND RECEIVING SYSTEM

CROSS-REFERENCE TO RELATED APPLICATIONS

This application claims the benefit of priority from Japanese Patent Application No. 2009-130807 filed on May 29, 2009, the entire contents of which are incorporated herein by reference.

BACKGROUND

1. Field

The embodiments discussed herein relate to a demodulating circuit.

2. Description of Related Art

For example, data may be assigned to a plurality of carriers mutually orthogonal to each other in an orthogonal frequency division multiplexing (OFDM) system for transmitting digital signals. This data may be modulated through inverse fast Fourier transform (IFFT) on a transmitter side. The data may then be demodulated through fast Fourier transform (FFT) on a receiver side. This type of OFDM system is adopted in Japanese Standards for digital terrestrial broadcasting, Integrated Services Broadcasting-Terrestrial (ISDB-T).

Related art is described in Japanese Laid-open Patent Publication No. 2007-324905 and Japanese Laid-open Patent Publication No. 2008-42574.

SUMMARY

According to one aspect of the embodiments, a demodulating circuit is provided which includes a fast Fourier transform circuit which fast Fourier transforms a received signal and outputs a plurality of carrier signals; an output selecting circuit which selects at least two signals from the plurality of carrier signals, the at least two signals including a first signal modulated in accordance with a first modulation method and a second signal modulated in accordance with a second modulation method; an inverse fast Fourier transform circuit which inverse Fourier transforms transmission path characteristic values including a first transmission path characteristic value obtained based on the first signal and a second transmission path characteristic value obtained based on the second signal; and an FFT window control circuit which controls a position of an FFT window based on the inverse Fourier transformed transmission path characteristic values.

Additional advantages and novel features of the invention will be set forth in part in the description that follows, and in part will become more apparent to those skilled in the art upon examination of the following or upon learning by practice of the invention.

DESCRIPTION OF EMBODIMENTS

In an OFDM system, a main wave reaching a receiver terminal via a direct path from a base station and a delay wave reaching the receiver terminal after being reflected and delayed may be superimposed on each other. The receiver terminal demodulates data through a fast Fourier transform (FFT) process. Even if a window for the FFT process is aligned with a symbol position of the main wave in the demodulation process, the introduction of the delayed wave may cause an inter-symbol interference. Since the FFT window is not aligned in position with the symbol of a demodulation target in the delayed wave, information of an adjacent symbol may intrude and demodulation of the symbol may become difficult. For this reason, a signal of an end portion of each symbol, such as a guard interval, is placed prior to the symbol. Since phase shifting takes place in response the forward shifting of the FFT window from the position of the symbol, inter-carrier interference, i.e., a signal interference between frequency components may not take place.

A scattered pilot (SP) signal for synchronized detection may be used to control the position of the FFT window. The SP signal is modulated through binary phase shift keying (BSPK), and is inserted into a data signal before being transmitted. Alternatively, the data signal may be modulated through quaternary phase shift keying (QPSK) or quadrature amplitude modulation (16 QAM) before being transmitted. The modulated signal may be transmitted as an SP carrier or a data carrier of the OFDM system.

Figure 1:
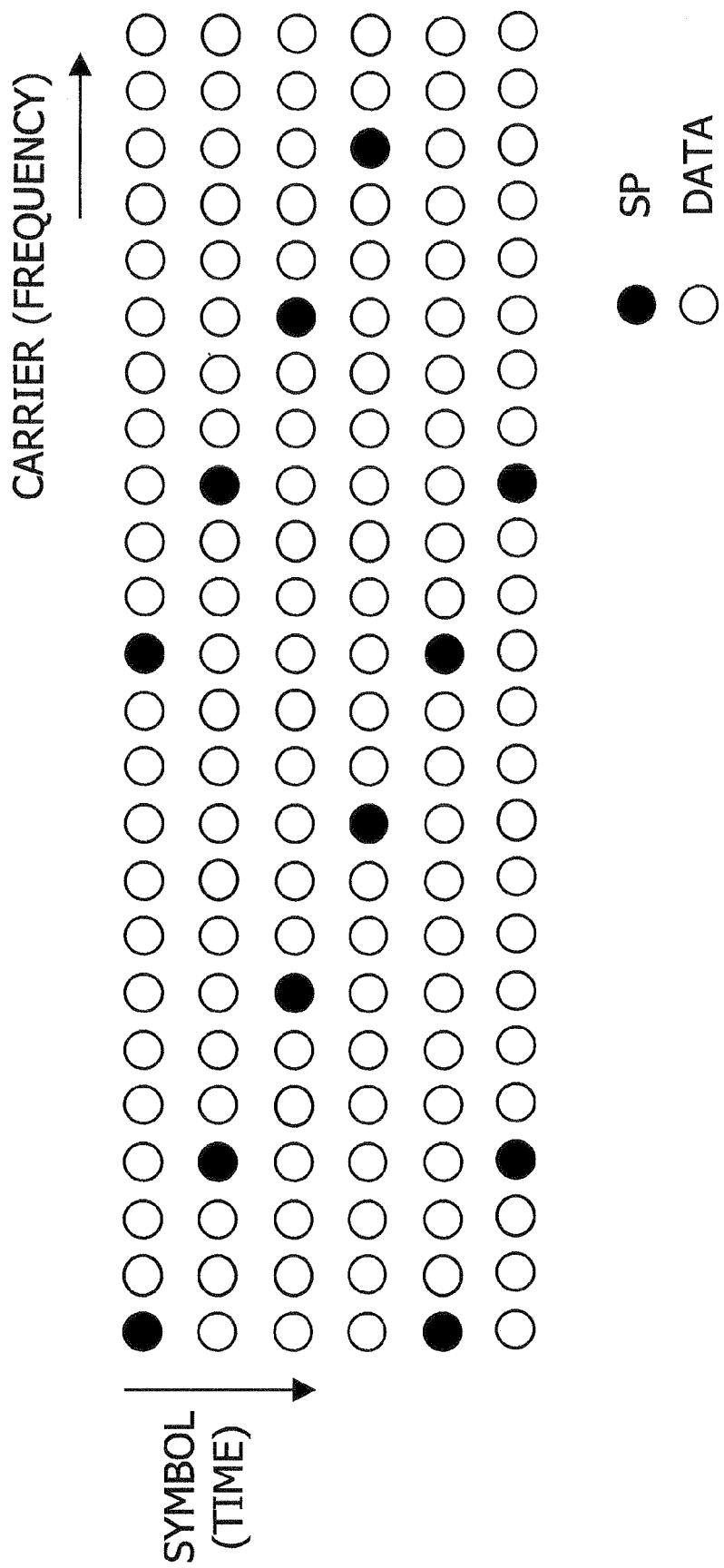
FIG. 1 illustrates an exemplary layout of SP carrier.

FIG. 1 illustrates an exemplary arrangement of a SP carrier. Circles horizontally lined in FIG. 1 may correspond to a plurality of mutually orthogonal carrier frequencies. Circles vertically lined in FIG. 1 may correspond to different symbols at different times. In the OFDM, the length of an IFFT window and an FFT window, such as the number of sample points, may correspond to one symbol. For example, a plurality of horizontally lined circles in FIG. 1 may correspond to one symbol. Referring to FIG. 1, a solid circle may denote the position of an SP carrier. A blank circle may denote the position of a data carrier.

The SP carrier may be a value BSPK modulated at any of the points (+1,0) and (−1,0) on the complex plane, and may be used in an equalization process of the carrier at a blank circle illustrated in FIG. 1. The SP signal at the position denoted by the solid circle is detected, and the received SP signal is divided by an SP signal inserted on the transmitter side to calculate a transmission path characteristic value so that a transmission path characteristic value may be calculated. The transmission path characteristic value at the position of each blank circle is estimated through interpolation based on the transmission path characteristic value at the position of the solid circle so that the estimated value of the transmission path characteristic value at each position may be obtained. The data signal is divided by the estimated value, and the transmission path characteristic value is equalized. For example, the received SP signal may be $(-a/\sqrt{2}, +a\sqrt{2})$ at the position of the solid circle where the SP signal (complex value) has $(-1,0)$. The transmission path characteristic value that has been determined by dividing the received SP signal by the SP signal $(-1,0)$ may be $(+a/\sqrt{2}, +a\sqrt{2})$. The carrier may advance in phase by 45 degrees because of transmission path characteristic, and the amplitude of the carrier may be increased by "a" times. The transmission path characteristic value interpolated at the position of the blank circle may be $(+a/\sqrt{2}, +a\sqrt{2})$. The carrier at the position of the blank circle may advance in phase by 45 degrees, and the amplitude of the carrier may be increased by "a" times. The amplitude and the phase are corrected by dividing the carrier signal by $(+a/\sqrt{2}, +a\sqrt{2})$. Since the SP signal is mapped to one of the points $(+1,0)$ and $(-1,0)$ through the binary phase-shift keying (BPSK) modulation, the SP signal may represent the transmission path characteristic value depending on a difference between the normalized positive and negative signs.

If the transmission path characteristic value of one symbol is inverse fast Fourier transformed and information along the frequency axis is converted into power information along the time axis, a delay profile may be obtained. The delay profile includes a waveform indicating a time position of the main wave, and a waveform indicating a time position of the delayed wave. Since the delay profile includes information as to a waveform along the time axis, a time difference between a peak value of the main wave and a peak value of the delayed wave may represents a magnitude a time delay of the delayed wave. A symbol position of the main wave is detected from the delay profile, and the FFT window is controlled to be aligned in position with the symbol of the main wave.

If a wave preceding in time the main wave aligned in position with the FFT window intrudes, a guard interval of a symbol subsequent to a symbol of the preceding wave enters the FFT window. If a plurality of received waves are superimposed on each other, the FFT window may be controlled to be aligned in position with the symbol of the preceding received wave.

Figure 5:
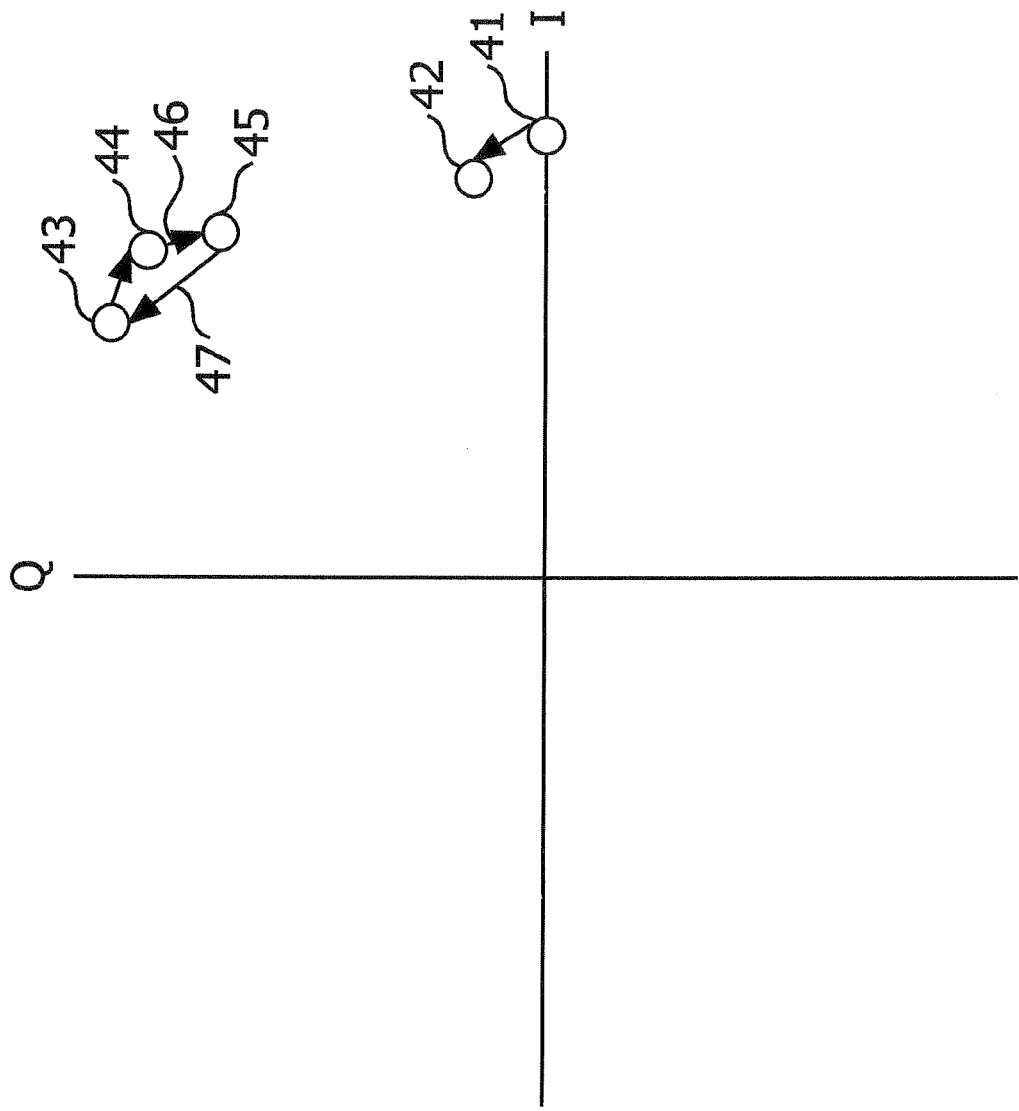
FIG. 5 illustrates an exemplary dividing process, an exemplary hard-decision process, an exemplary reliability extraction process, and an exemplary transmission path characteristic value calculation process.

For example, if an SP carrier for transmission path estimation is inserted at a position illustrated in FIG. 5, the transmission path characteristic value is used for every three carriers on substantially the same symbol at substantially the same time. The transmission path characteristic value that is obtained by interpolating, along the time axis, information of the SP carriers at the position of each solid circle is present on every three carriers on substantially the same symbol included in the horizontally lined circles. The cycle of the fundamental frequency may be ⅓ symbol length, and the cycle of the waveform, the transmission path characteristic value of which is inverse fast Fourier transformed, along the time axis may be ⅓ symbol length. A repetition error may be present at intervals of ⅓ symbol length.

One symbol interval may be 1.008 ms, and a ⅓ symbol interval may be 336 μs in mode 3 in the ISDB-T. Since a delay to ±⅙ symbol interval is detected, a multi-path having a time difference of ±168 μs may be detected. When a wave preceding by 200 μs may be present, for example, the wave preceding by 200 μs may become a wave that has delayed by 136 μs (=168−(200−168)) due to aliasing error.

If the guard length is ⅛ in mode 3 in the ISDB-T, the guard interval may be 126 μs. Appropriate FFT window control may be performed on multi-path received waves distributed within and outside a range of the guard interval.

Figure 2:
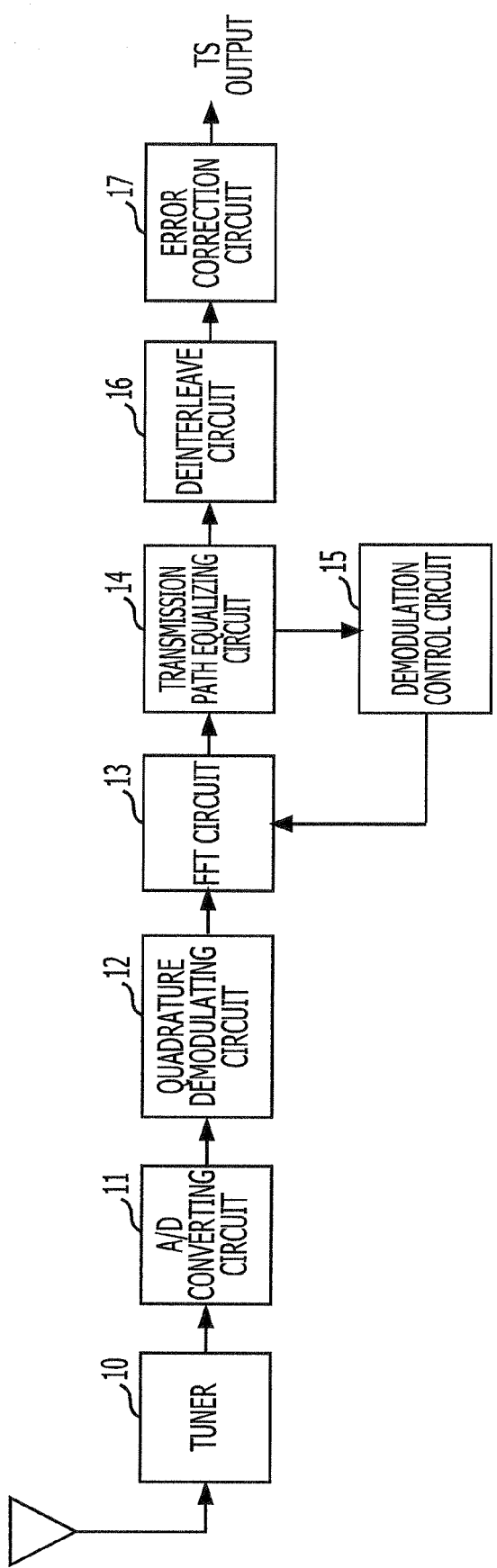
FIG. 2 illustrates an exemplary OFDM demodulating circuit.
Figure 10:
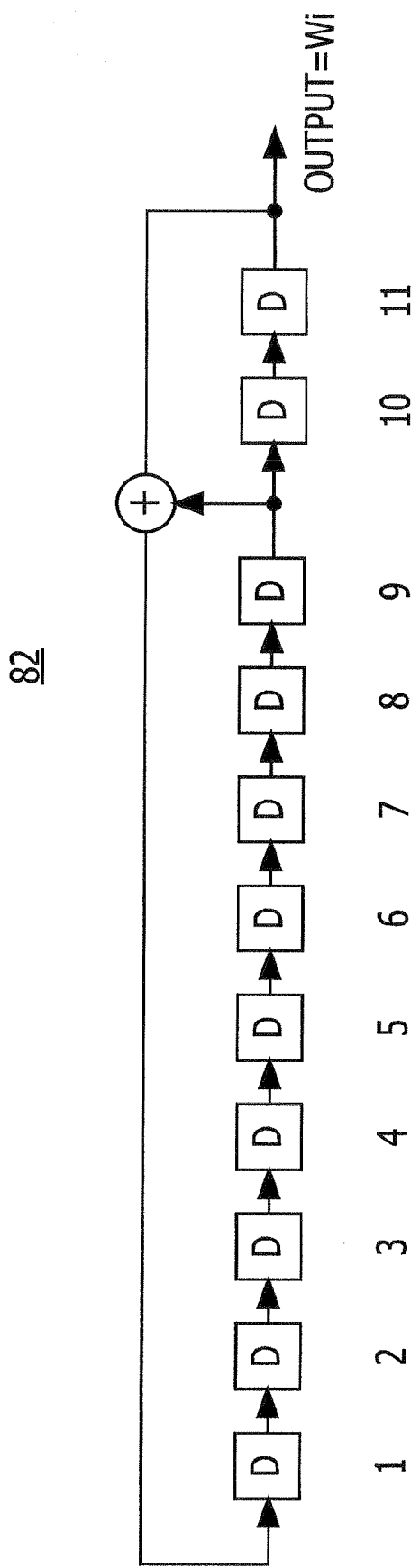
FIG. 10 illustrates an exemplary PRBS generating circuit.

FIG. 2 illustrates an exemplary OFDM demodulating circuit. The exemplary OFDM demodulating circuit illustrated in FIG. 10 may receive digital terrestrial broadcasting.

The OFDM demodulating circuit of FIG. 2 includes tuner 10, analog-to-digital converter 11, quadrature modulating circuit 12, FFT circuit 13, transmission path equalizing circuit 14, demodulation control circuit 15, deinterleave circuit 16, and error correction circuit 17. A signal received by an antenna is input to the tuner 10. The tuner 10 extracts from the received signal a signal within a frequency band corresponding to a specified reception channel, converts the extracted signal into an intermediate frequency (IF) signal, and outputs the IF signal. The analog-to-digital converter 11 converts the output signal as an analog signal from the tuner 10 into a digital signal. The quadrature modulating circuit 12 converts the output digital signal from the analog-to-digital converter 11 into a complex baseband signal. The FFT circuit 13 fast Fourier transforms the complex baseband signal, thereby converting the complex baseband signal from a signal in the time domain into a signal in the frequency domain. An orthogonal frequency-division multiplexed signal is demodulated, and a plurality of carrier signals are obtained. The output of the FFT circuit 13 includes a data signal, an SP signal, an auxiliary channel (AC) carrier for additional information transmission, and a transmission and multiplexing configuration control (TMCC) carrier for transmission parameter information. The SP signal is BSPK modulated. The data signal is modulated through one of QPSK, 16 QAM, and 64 QAM. An AC signal of the AC carrier and a TMCC signal of the TMCC carrier are differential BPSK (DBPSK) modulated.

The transmission path equalizing circuit 14 equalizes transmission path characteristics of the data signal output from the FFT circuit 13 in response to the SP signal output from the FFT circuit 13. The equalized data signal is then supplied to the deinterleave circuit 16. In order to facilitate data correction, the deinterleave circuit 16 disperses a burst error to be a random error. The deinterleave circuit 16 performs a deinterleave process to modify the order of data. The deinterleave process includes a frequency deinterleave process to re-arrange the data in the frequency domain and a time deinterleave process to re-arrange the data in the time domain. The frequency deinterleave process is performed, then the received symbol is soft-decision processed through demapping and then bit data is time-interleaved.

The error correction circuit 17 corrects an error of the soft-decision processed data through maximum likelihood detection by Viterbi decoding. The error corrected data is output as a transport stream (TS). An MPEG decoder in a later stage provided in the OFDM demodulating circuit decodes the transport stream.

Figure 3:
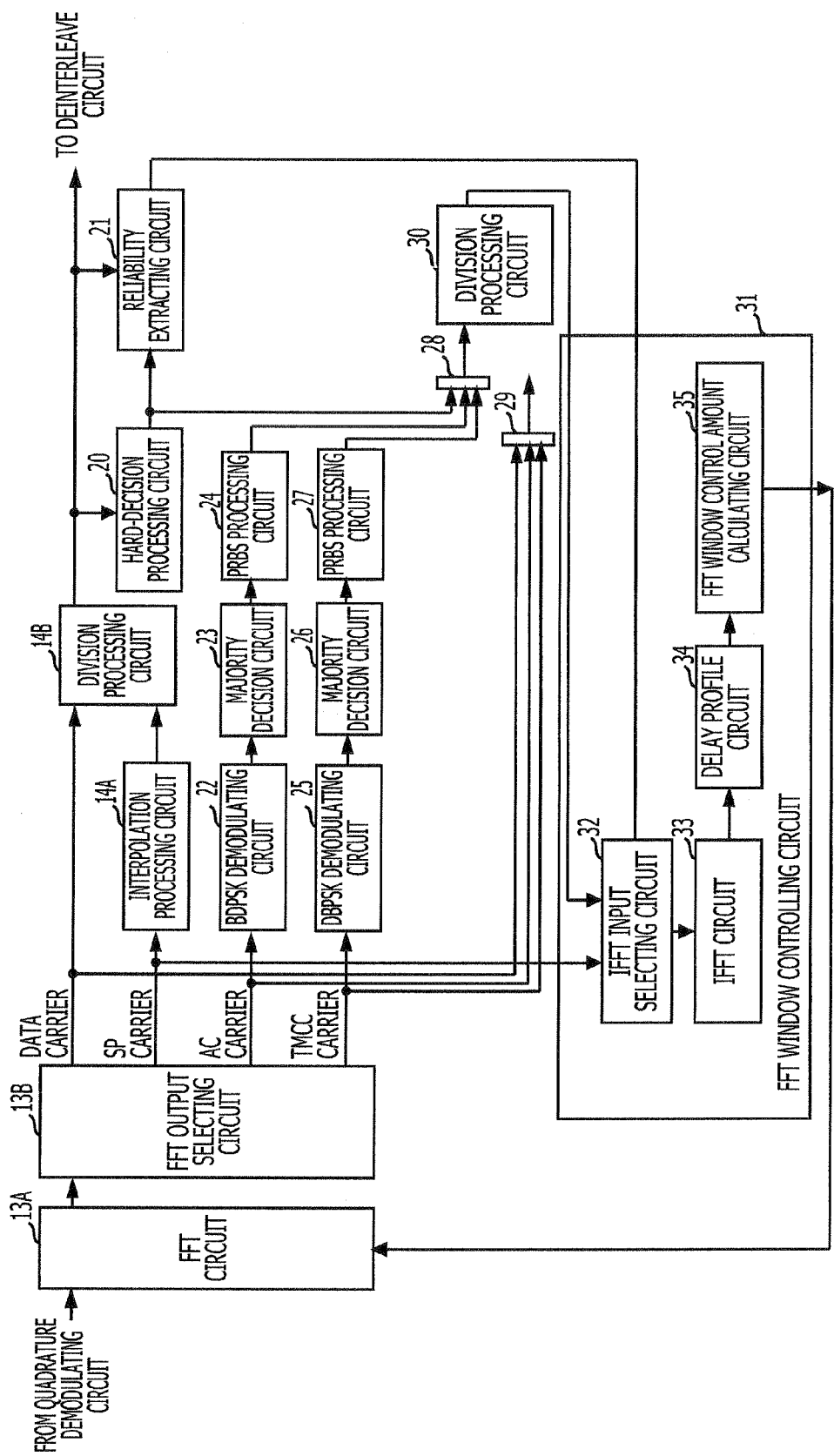
FIG. 3 illustrates an exemplary fast Fourier transform (FFT) circuit, an exemplary transmission path equalizing circuit, and an exemplary demodulation control circuit.

FIG. 3 illustrates an exemplary FFT circuit, an exemplary transmission path equalizing circuit, and an exemplary demodulation control circuit. The exemplary FFT circuit, the exemplary transmission path equalizing circuit, and the exemplary demodulation control circuit illustrated in FIG. 3 may be the FFT circuit 13, the transmission path equalizing circuit 14, and the demodulation control circuit 15, respectively, illustrated in FIG. 2. The circuit illustrated in FIG. 3 performs an OFDM demodulation process. The circuit illustrated in FIG. 3 includes FFT circuit 13A, FFT output selecting circuit 13B, interpolation processing circuit 14A and division processing circuit 14B. The FFT circuit 13A and the FFT output selecting circuit 13B may correspond to the FFT circuit 13 illustrated in FIG. 2. The interpolation processing circuit 14A and the division processing circuit 14B may correspond to the transmission path equalizing circuit 14. The demodulation control circuit 15 includes hard-decision processing circuit 20, reliability extracting circuit 21, DBPSK demodulating circuit 22, majority decision circuit 23, PRBS processing circuit 24, DBPSK demodulating circuit 25, majority decision circuit 26, PRBS processing circuit 27, selectors 28 and 29, division processing circuit 30, and FFT window controlling circuit 31. The FFT window controlling circuit 31 includes IFFT input selecting circuit 32, IFFT circuit 33, delay profile circuit 34, and FFT window control amount calculating circuit 35.

The FFT circuit 13A fast Fourier transforms a signal from the quadrature modulating circuit 12, thereby outputting a plurality of carrier signals. The FFT output selecting circuit 13B selects among the plurality of carrier signals output from the FFT circuit 13A at least two signals including a first signal modulated in accordance with a first modulation method and a second signal modulated in accordance with a second modulation method. The FFT output selecting circuit 13B then separates these signals and outputs the separated signals. For example, four signals may be separated. The four signals may include a data signal of a data carrier, an SP signal of an SP carrier, an AC signal of an AC carrier, and a TMCC signal of a TMCC carrier. The first signal modulated in accordance with the first modulation method may be the SP signal. The second signal modulated in accordance with the second modulation method may be one of the data signal, the AC signal, and the TMCC signal.

The IFFT circuit 33 inverse fast Fourier transforms transmission path characteristic values including a first transmission path characteristic value obtained in response to the first signal output from the FFT output selecting circuit 13B and a second transmission path characteristic value obtained in response to the second signal output from the FFT output selecting circuit 13B. If the second signal includes the data signal, the inverse fast Fourier transform (IFFT) process is performed on a signal value string including the transmission path characteristic value responsive to the SP signal as the first signal, and the transmission path characteristic value responsive to the data signal as the second signal. If the second signal includes the AC signal, the inverse fast Fourier transform (IFFT) process is performed on a signal value string including the transmission path characteristic value responsive to the SP signal as the first signal, and the transmission path characteristic value responsive to the AC signal as the second signal. The number of signal points of the IFFT process performed by the IFFT circuit 33 may be substantially equal to the number of carriers output from the FFT circuit 13A. The value of an adjacent point may be used for a signal point having no signal during the IFFT process. Alternatively, a signal point may be interpolated using a linear interpolation technique.

The delay profile circuit 34 sums the square of a real part and the square of an imaginary part of a complex value output from the IFFT circuit 33 to determine power. The delay profile circuit 34 thus acquires a delay profile representing a timing of a received wave along the time axis. The delay profile includes a plurality of waveforms indicating the time positions of the multi-path received waves. The FFT window control amount calculating circuit 35 determines the position of the received wave to be aligned in position with the FFT window based on the delay profile, and then calculates a deviation from the position of the FFT window. The FFT circuit 13A controls the position of the FFT window in response to the signal obtained by inverse fast Fourier transform on the transmission path characteristic. The FFT circuit 13A shifts the FFT window by the deviation calculated by the FFT window control amount calculating circuit 35, and thus places the FFT at an appropriate position in the received signal.

The two signals output from the FFT output selecting circuit 13E may include a third signal modulated in accordance with a third modulation method. The transmission path characteristic values to be inverse fast Fourier transformed by the IFFT circuit 33 may include the first and the second transmission path characteristic values and a third transmission path characteristic value obtained in response to the third signal. The first through third signals may be the SP signal, the data signal, and the AC signal, respectively. The first through third signals may be the SP signal, the data signal, and the TMCC signal, respectively. The first through third signals may be the SP signal, the AC signal, and the TMCC signal, respectively.

The two signals output from the FFT output selecting circuit 13B may be any two signals of the four signals including the data signal, the SP signal, the AC signal, and the TMCC signal. The transmission path characteristic values to be inverse fast Fourier transformed by the IFFT circuit 33 may include a transmission path characteristic value responsive to the data signal, a transmission path characteristic value responsive to the SP signal, a transmission path characteristic value responsive to the AC signal, and a transmission path characteristic value responsive to the TMCC signal.

Any combination of signals provides a large quantity of information to be used to determine the delay profile. For example, the number of signal points of IFFT having effective signals is large. The delay profile may be obtained from within a wide time range.

Figure 4:
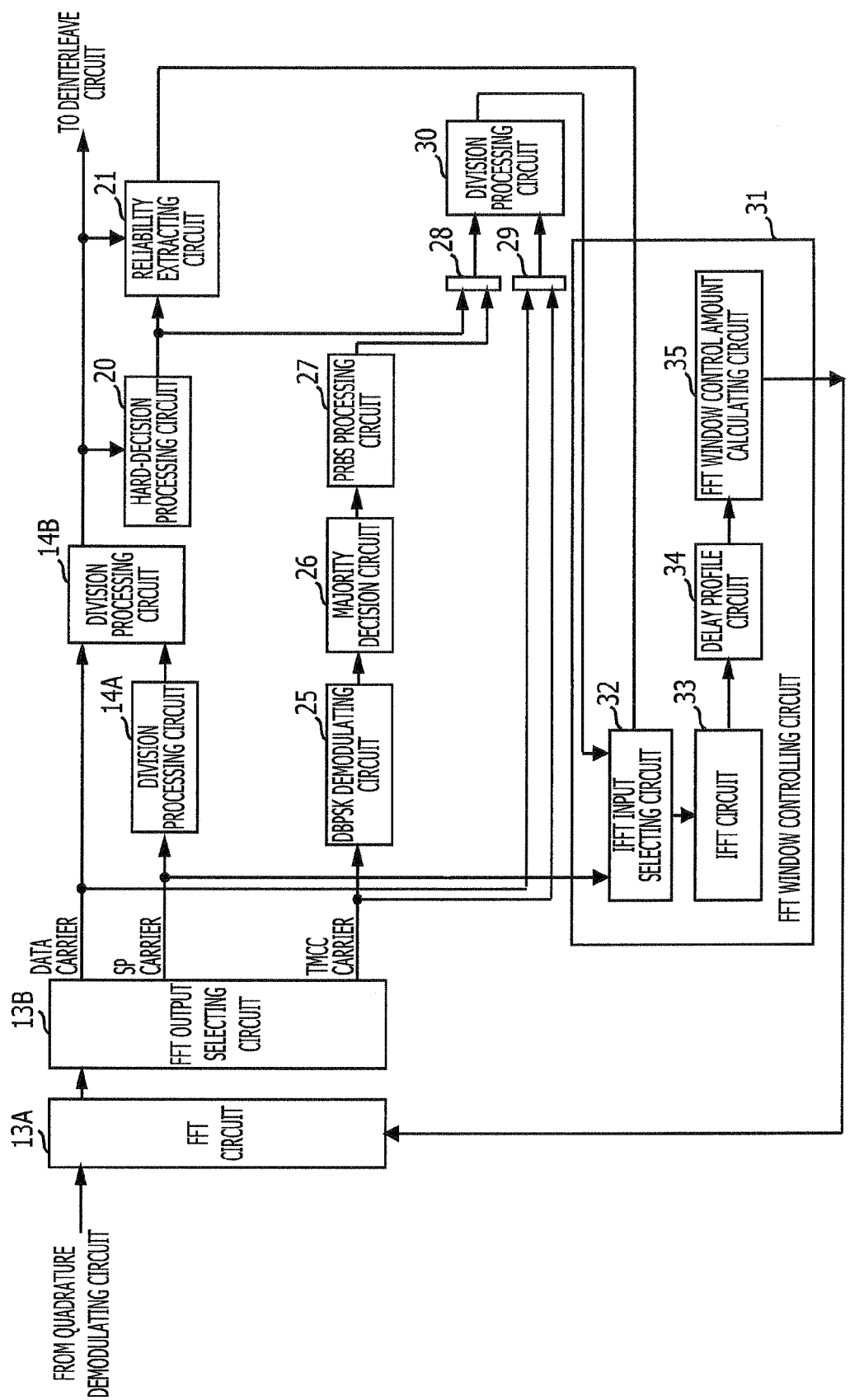
FIG. 4 illustrates an exemplary FFT output selecting circuit.

An appropriate delay profile is acquired based on a combination of at least two signals of the data signal, the SP signal, the AC signal, and the TMCC signal. The position of an appropriate FFT window is controlled based on the delay profile. FIG. 4 illustrates an FFT output selecting circuit 13B. The FFT output selecting circuit 13B illustrated in FIG. 4 may output three signals of the data signal, the SP signal, and the TMCC signal. The circuit illustrated in FIG. 4 may not include the DBPSK demodulating circuit 22, the majority decision circuit 23, and the PRBS processing circuit 24 for the AC signal, illustrated in FIG. 3. A demodulating circuit outputting a combination of at least two signals of the data signal, the SP signal, the AC signal, and the TMCC signal may be applied.

The transmission path characteristic value is determined based on the SP signal at a black circle, for example, at the position of the SP carrier. The interpolation processing circuit 14A estimates the transmission path characteristic value at the position of the data carrier through an interpolation process, based on the transmission path characteristic value at the position of the SP carrier. The interpolation processing circuit 14A thus determines an estimated value of the transmission path characteristic value at each position. The division processing circuit 14B divides the data signal output from the FFT circuit 13 based on the value estimated by the interpolation processing circuit 14A so that the transmission path characteristics is equalized.

The hard-decision processing circuit 20 performs a hard-decision process by assigning an equalized data signal output from the division processing circuit 14B to a signal point of the modulation method. For example, for a QPSK system, the received data signal may be assigned to one of the four signal points on the complex plane. Information indicating the modulation method is obtained by decoding the TMCC signal. A value indicating the signal point as a result of the hard-decision process is supplied to the reliability extracting circuit 21 and is also supplied to the division processing circuit 30 via the selector 28.

The reliability extracting circuit 21 outputs a reliability value indicating a reliability of the transmission path characteristic value responsive to the data signal. The reliability extracting circuit 21 determines a distance between a signal prior to the hard-decision process output from the division processing circuit 14B and a signal subsequent to the hard-decision process output from the hard-decision processing circuit 20, and then determines the reliability in response to the distance. The reliability is simply a value responding to the magnitude of difference between the signal prior to the hard-decision process and the signal subsequent to the hard-decision process. For example, the reliability may be the absolute value of a difference between the powers of the signals.

In response to the signal supplied as a result of the hard-decision process via the selector 28, the division processing circuit 30 divides the value of the data signal of the data carrier supplied from the FFT output selecting circuit 13B via the selector 29 by the signal as a result of the hard-decision process. A received signal is thus divided by a transmission signal. The transmission path characteristic value is thus determined. The selectors 28 and 29 may select the carriers in the order of small number to large number, and the division processing circuit 30 serially performs the division process on the carriers.

FIG. 5 illustrates an exemplary division process, an exemplary hard-decision process, an exemplary reliability extraction process, and an exemplary transmission path characteristic value calculation process. The division process is performed in order to equalize the signals. In the complex plane in FIG. 5, the abscissa represents a real number axis (I axis), and the ordinate represents an imaginary number axis (Q axis). An SP signal 41 having a BPSK modulated value (+1,0) is received as an SP signal 42 under the effect of a transmission path. If the effect of the transmission path on a data signal 43 is substantially identical to the effect on the SP signal 41, a data signal point 44 having an equalized transmission path characteristic is obtained by dividing the data signal 43 by the complex value of the signal 42. The division process may be performed by the division processing circuit 14B illustrated in FIG. 3.

The data signal point 44 is assigned to a signal point 45 (complex values=(1/√2, 1/√2)) closest in distance to the data signal point 44 from among four QPSK signal points, and the hard-decision process is then performed. The hard-decision processed signal may be the value of the signal point 45. The hard-decision processing circuit 20 illustrated in FIG. 3 may perform the hard-decision process. A arrow-headed path 46 represents a distance between the signal 45 and the signal 44 prior to the hard-decision process. The distance between the signal 45 and the signal 44 may be an index indicating the reliability of the hard-decision process. The longer the distance, the lower the reliability of the hard-decision process. The shorter the distance, the higher the reliability of the hard-decision process. The reliability of the hard-decision process may be accounted in the reliability of the transmission path characteristic value obtained based on the results of the hard-decision process. A value responsive to the distance between the signal 45 and the signal 44 may be used for the reliability of the transmission path characteristic value. The reliability extracting circuit 21 illustrated in FIG. 3 may determine the reliability.

By dividing the data signal 43 of the received data by the signal point 45, the deviation of the signal caused by signal transmission may be represented by an arrow-headed path 47. The division process results in the transmission path characteristic value. The transmission path characteristic value may be a value that is obtained by performing a clockwise rotation operation on the data signal 43, for example, by rotating the signal point 45 to (+1,0) on the complex plane of FIG. 5.

In response to the reliability value supplied from the reliability extracting circuit 21, the IFFT input selecting circuit 32 illustrated in FIG. 3 selects the transmission path characteristic value determined by the division processing circuit 30 in response to the data signal. For example, a transmission path characteristic value having a high reliability may be selected and then inverse fast Fourier transformed.

The DBPSK demodulating circuit 22 demodulates the AC signal represented by the AC carrier prior to demodulation, thereby determining the demodulated AC signal. A difference is determined between an AC signal of a specific AC carrier in a given symbol and an AC signal of a specific AC carrier in a next symbol. The difference is then assigned to a demapped signal point and the demodulated AC signal is obtained. The majority decision circuit 23 may extract a signal having the highest frequency from among a plurality of AC signals to which the same value is inserted on the transmitter side. The same information may be inserted into AC signals by segment. For example, AC signals of eight AC carriers, i.e., carrier numbers 7, 89, 206, 209, 226, 244, 377, and 407 are inserted into one-segment band in mode 3 in the ISDB-T. For example, a signal is selected from the eight AC signals on the majority principle, and it is then determined whether the demodulation results are 0 or 1. Instead of determining the demodulated AC signal, the DBPSK demodulation process may be performed after summing phase differences of the signals of the AC carriers.

The PRBS processing circuit 24 obtains a DBPSK modulated AC signal from the demodulated AC signal according to a pseudo-random bit sequence generated by a pseudo-random bit sequencer (PRES) generating circuit. In accordance with the pseudo-random bit sequence, the DBPSK modulated AC signal inserted in the 0-th symbol on the transmitter side, from among 0-th symbol through 203rd symbol arranged in the ISDB-T, is generated. Since the substantially same pseudo-random bit sequence is used on the receiver side, the DBPSK modulated AC signal is determined based on the demodulated AC signal.

If the modulated AC signal obtained by modulating the demodulated AC signal is supplied via the selector 28, the division processing circuit 30 divides the received AC signal of the AC carrier supplied from the FFT output selecting circuit 13B via the selector 29 by the modulated AC signal. The received signal is divided by the transmission signal and the transmission path characteristic value is obtained.

The DBPSK demodulating circuit 25 determines the demodulated TMCC signal by demodulating the undemodulated TMCC signal indicated by the TMCC carrier. A difference is determined between the TMCC signal of a specific TMCC carrier in a given symbol and the TMCC signal of a specific TMCC carrier in a next symbol. The demapped difference is assigned to a signal point and the demodulated TMCC is obtained. The PRBS processing circuit 24 may extract a signal having the highest frequency from among a plurality of TMCC signals to which substantially the same value is inserted on the transmitter side. Substantially the same information may be inserted into TMCC signals by segment. For example, TMCC signals of four TMCC carriers, i.e., carrier numbers 101, 131, 286, and 349 are inserted into one-segment band in mode 3 in the ISDB-T. A one-segment receiver may select a signal from the four TMCC signals on the majority principle. On a 13-segment receiver, the four AC carriers included in each of the 13 segments may be substantially identical to each other, and a signal is selected on the majority principle from the 52 (4×13) AC signals. Instead of selecting the demodulated AC signal, the DBPSK demodulation process may be performed after phase differences of the signals of the AC carriers are summed. An operation of the PRBS processing circuit 27 may be substantially identical to or similar to that of the PRBS processing circuit 24.

If the modulated TMCC signal obtained by modulating the demodulated TMCC signal is supplied via the selector 28, the division processing circuit 30 divides the received TMCC signal of the TMCC carrier supplied from the FFT output selecting circuit 13B via the selector 29 by the modulated TMCC signal. The received signal is divided by the transmission signal and the transmission path characteristic value is obtained.

Figure 6:
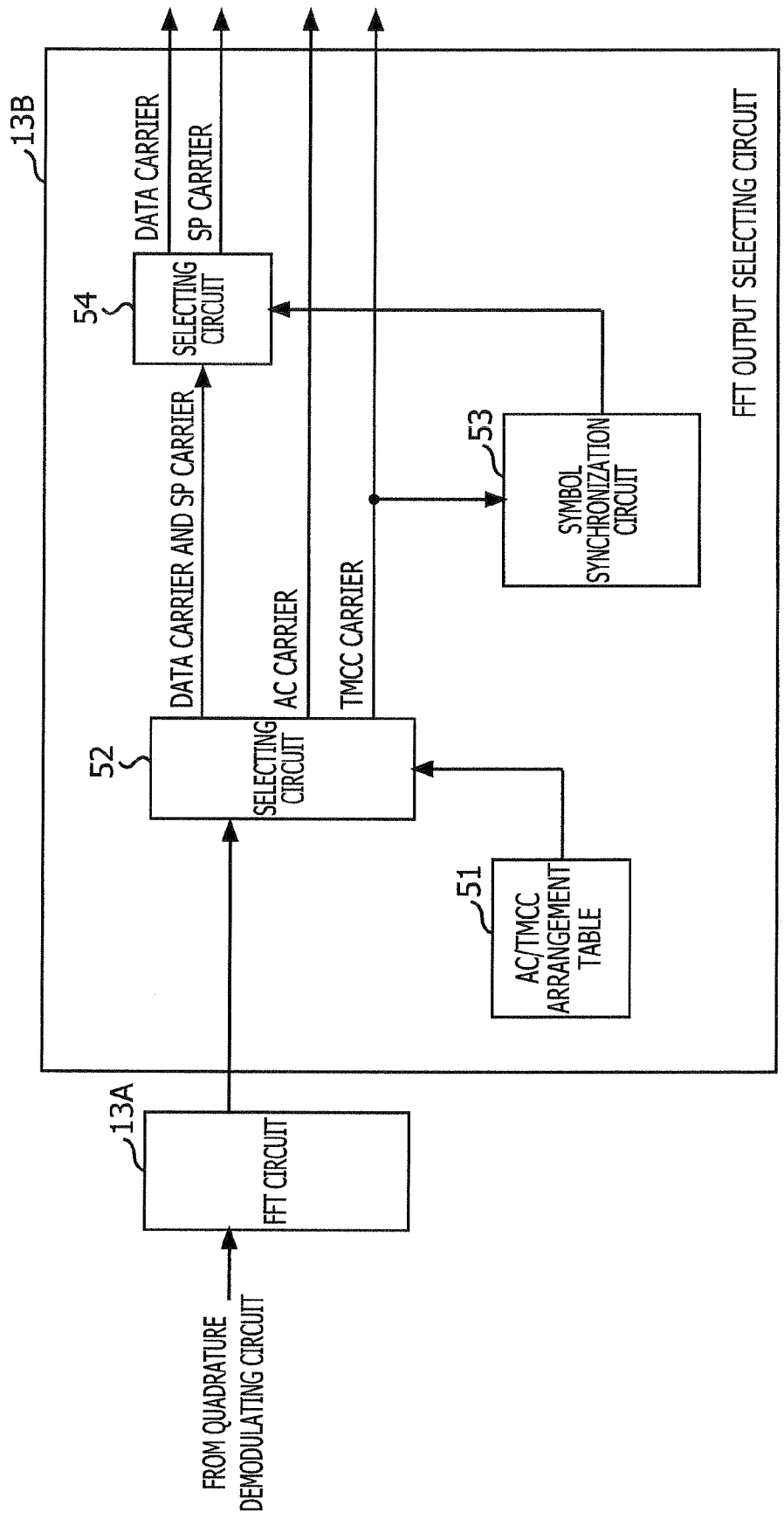
FIG. 6 illustrates an exemplary FFT output selecting circuit.

FIG. 6 illustrates an exemplary FFT output selecting circuit 13B. The FFT output selecting circuit 13B illustrated in FIG. 6 includes AC/TMCC arrangement table 51, selecting circuit 52, symbol synchronization circuit 53, and selecting circuit 54. The AC/TMCC arrangement table 51 stores, as arrangement data, the carrier number of an AC carrier and the carrier number of a TMCC carrier. The selecting circuit 52 separates the AC carrier and the TMCC carrier in response to the carrier number of the AC carrier and the carrier number of the TMCC carrier supplied from the AC/TMCC arrangement table 51 and outputs the separated AC carrier and TMCC carrier. The selecting circuit 52 outputs together the remaining carriers as a data carrier and an SP carrier. The symbol synchronization circuit 53 recognizes a symbol number based on information inserted in symbol numbers 1 through 6 of the TMCC carriers, and establish symbol synchronization. In response to the symbol number recognized by the symbol synchronization circuit 53, the selecting circuit 54 selects the data carrier and the SP carrier of each symbol. For example, as illustrated in FIG. 1, the position of a blank circle representing the data carrier and the position of a solid circle representing the SP carrier may be different depending on the symbol number. Therefore, the selecting circuit 54 identifies the carrier in response to the symbol number. The selecting circuit 54 separates the data carrier from the SP carrier based on the identified carrier.

Figure 7:
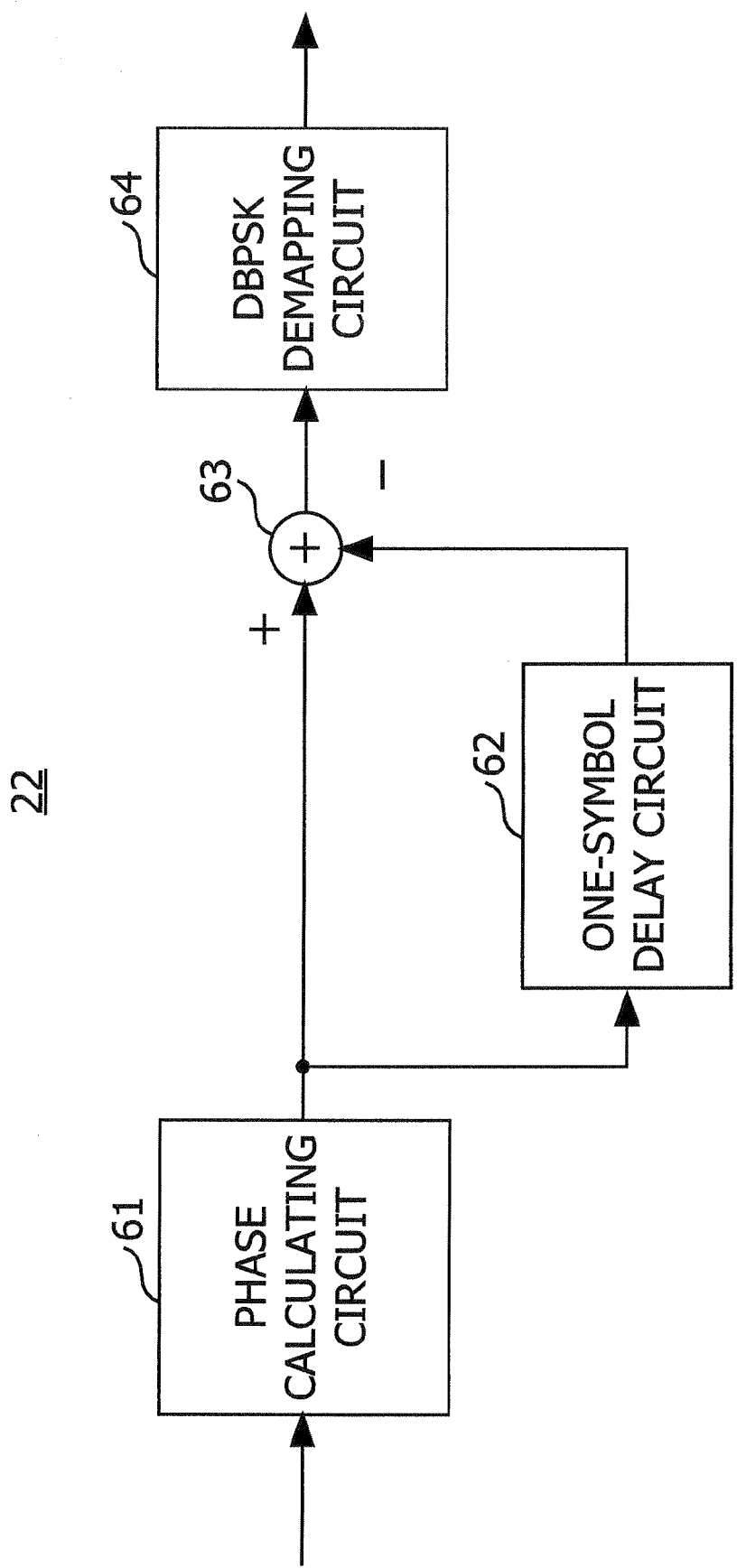
FIG. 7 illustrates an exemplary DBPSK demodulating circuit.

FIG. 7 illustrates an exemplary DBPSK demodulating circuit 22. The DBPSK demodulating circuit 22 illustrated in FIG. 7 may be substantially identical to or similar to the DBPSK demodulating circuit 25. The DBPSK demodulating circuit 22 includes phase calculating circuit 61, one-symbol delay circuit 62, subtractor circuit 63, and DBPSK demapping circuit 64. The phase calculating circuit 61 calculates the phase of the signal of the AC carrier, i.e., the DBPSK modulated AC signal. The one-symbol delay circuit 62 delays the calculated phase by 1 symbol. The subtractor circuit 63 calculates a phase difference by subtracting the phase of a DBPSK modulated AC signal preceding by 1 symbol from the phase of a present DBPSK modulated AC signal. The DBPSK demapping circuit 64 demodulates an AC signal prior to DBPSK modulation based on the phase difference calculated by the subtractor circuit 63. For example, if the phase difference is close to "0," the demodulated AC signal may be approximately zero. If the phase difference is close to ±π, the demodulated AC signal may be approximately "1."

Figure 8:
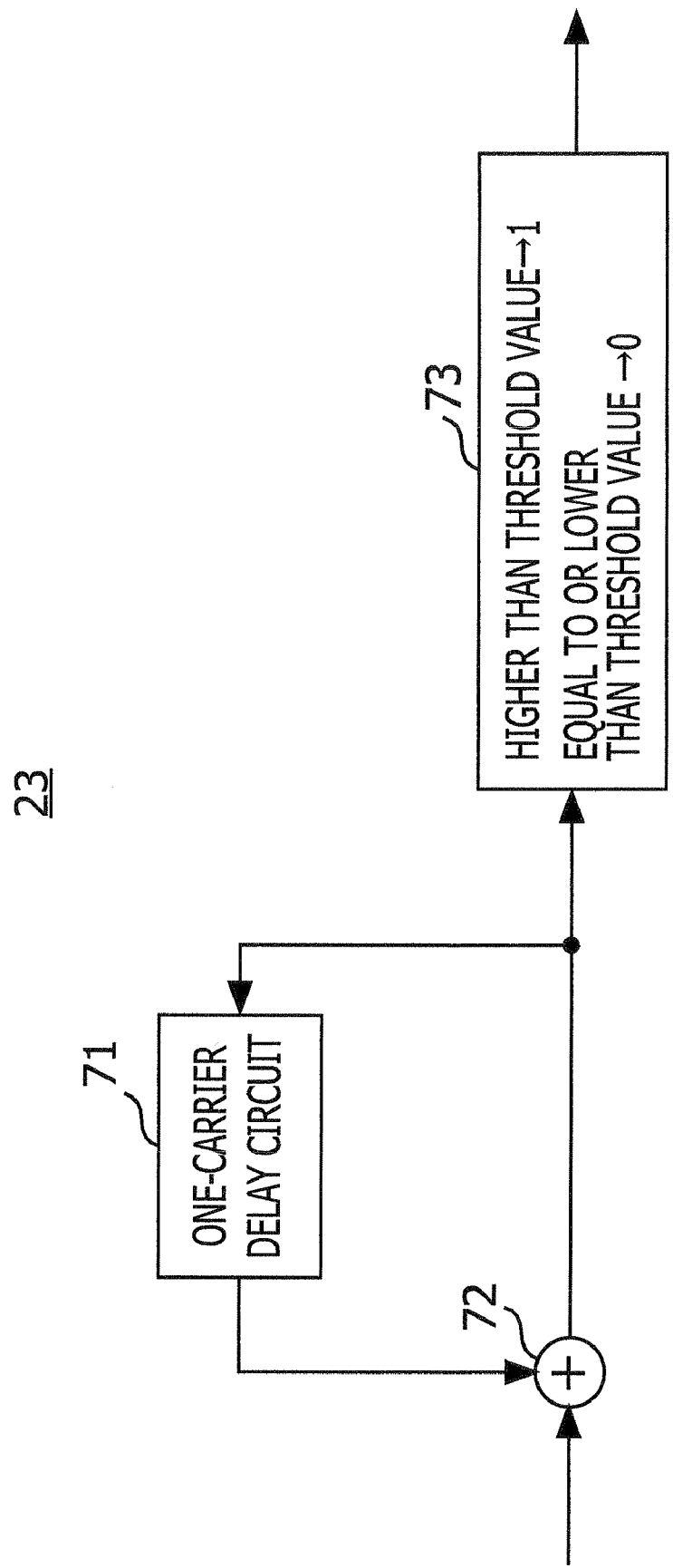
FIG. 8 illustrates an exemplary majority decision circuit.

FIG. 8 illustrates an exemplary majority decision circuit 23. The exemplary majority decision circuit 23 may be substantially identical or similar in structure to the majority decision circuit 26. The majority decision circuit 23 illustrated in FIG. 8 includes one-carrier delay circuit 71, adder circuit 72, and threshold processing circuit 73. The adder circuit 72 determines a sum signal by adding an sum signal supplied from the one-carrier delay circuit 71 to the demodulated AC signal of the AC carrier supplied from the DBPSK demodulating circuit 22. The one-carrier delay circuit 71 delays the sum signal by one AC carrier, and supplies the delayed sum signal to the adder circuit 72. The one-carrier delay circuit 71 and the adder circuit 72 sum the demodulated AC signals of the AC carriers, thereby determining the summed value. The threshold processing circuit 73 may output "1" if the summed AC signals are higher than a specific threshold value or if the summed AC signals are equal to or lower than the specific threshold value. A signal is selected from a plurality of demodulated AC signals on the majority principle.

Figure 9:
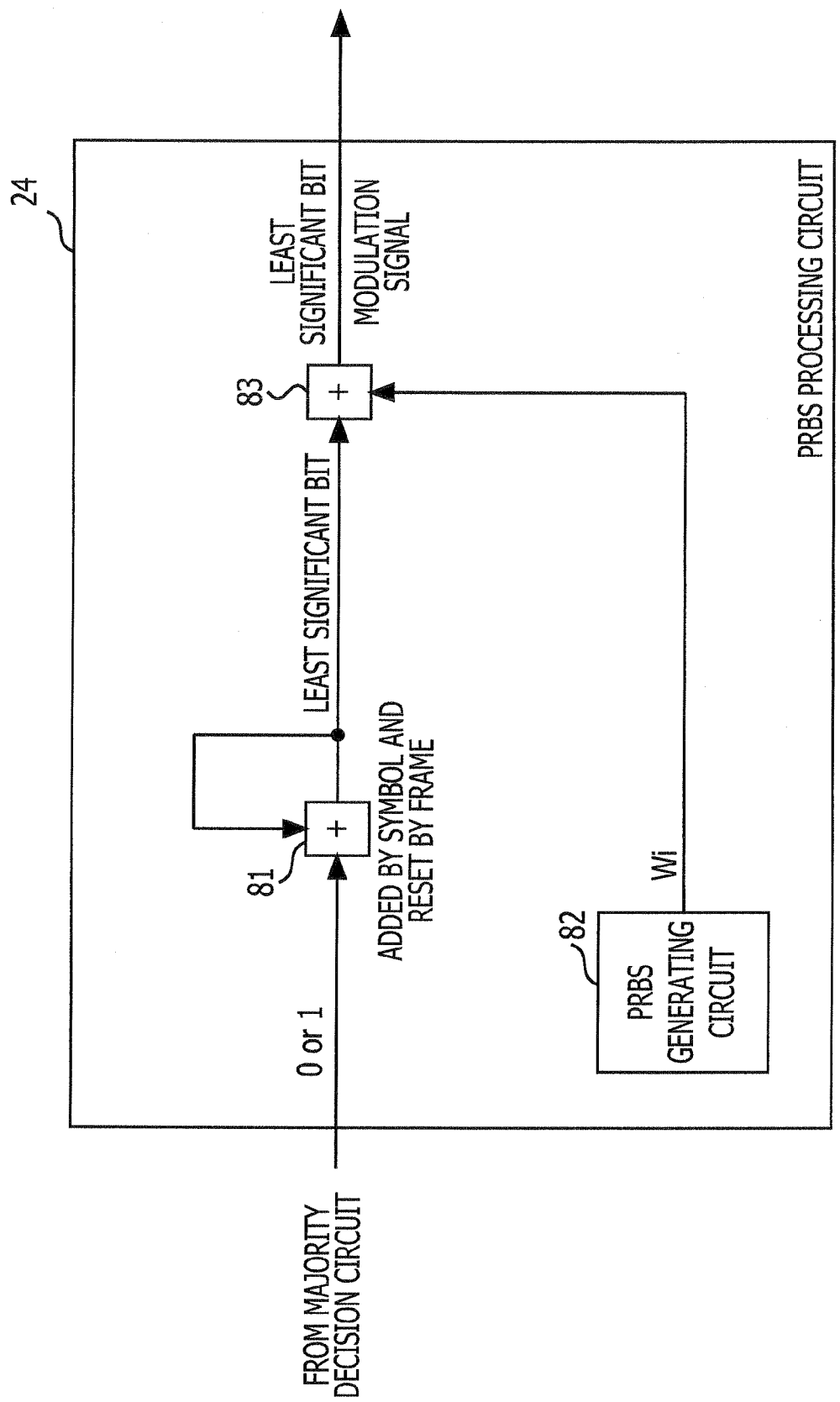
FIG. 9 illustrates an exemplary PRBS processing circuit.

FIG. 9 illustrates an exemplary PRBS processing circuit 24. The configuration of the PRBS processing circuit 24 may be substantially identical or similar to the configuration of the PRBS processing circuit 27 illustrated in FIG. 3. The PRBS processing circuit 24 illustrated in FIG. 9 includes adder circuit 81, PRBS generating circuit 82, and adder circuit 83. Differential modulation of the ISDB-T may be expressed by the following equations:

$$B'_0 = W_i \quad \text{(Differential reference)}$$

$$B'_k = B'_{k-1} \oplus B_k \text{ (k=1, 203 and } \oplus \text{ represents an exclusive OR gate)}$$

where $B_k$ represents AC data, $B'_k$ represents an AC transmission signal subsequent to a differential modulation process, and $W_i$ represents an initial value serving as a reference for a differential modulation signal. The initial value $W_i$ may be generated by the PRBS generating circuit 82 illustrated in FIG. 10. The PRBS generating circuit 82 illustrated in FIG. 10 generates a pseudo-random bit sequence in accordance with a polynomial equation $g(x)=X11+X9+1$.

An AC transmission signal of a symbol having a symbol number 0 subsequent to differential modulation may be $W_i$. An AC transmission signal of each of the symbols having symbol numbers 1-203 subsequent to differential modulation may be a value obtained by exclusive-OR-gating AC data to be transmitted and an AC transmission signal of a symbol preceding by one symbol.

The adder circuit 81 illustrated in FIG. 9 adds the demodulated AC signal 0 or 1 of a symbol supplied from the majority decision circuit 23 to the output of the adder circuit 81 preceding by one symbol, and outputs the least significant bit of the addition results. An exclusive OR gated value may be obtained. The adder circuit 83 adds the output of the adder circuit 81 to the bit value $W_i$ generated by the PRBS generating circuit 82, and outputs the least significant bit of the addition results. An exclusive OR gated value may be obtained. The differential modulation of the ISDB-T determines $B'_k$ as the differentially modulated AC transmission signal s based on $B_k$ demodulated from the received signal.

A differential modulation signal representing a transmission point of the AC signal of each symbol may be obtained. A differential modulation signal representing a transmission point of the TMCC signal of each symbol may be obtained. When the division processing circuit 30 divides a complex value of a transmission point by a complex value of a reception point prior to demodulation, the transmission path characteristic value of each of the AC carrier and the TMCC carrier is determined.

Figure 11:
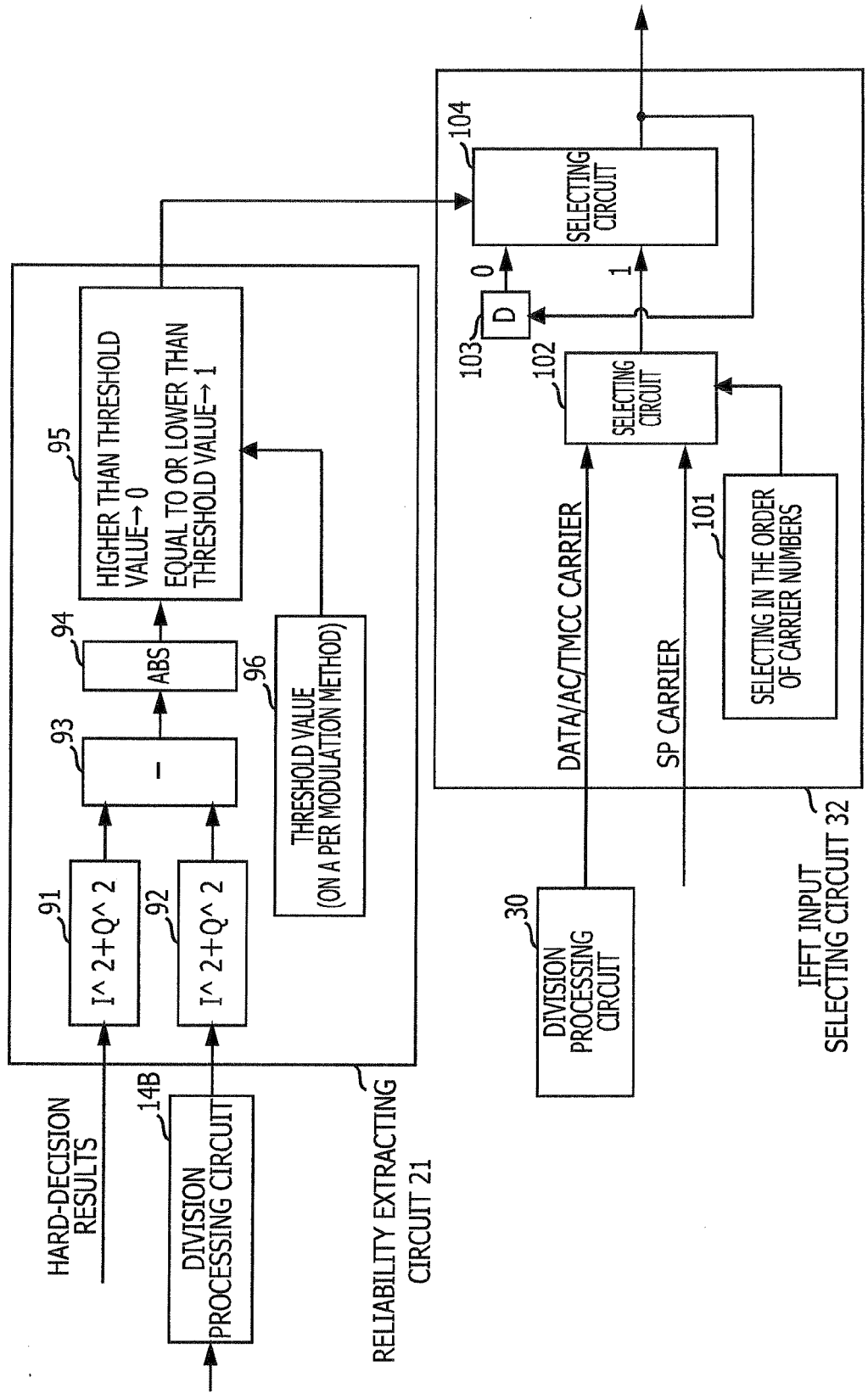
FIG. 11 illustrates an exemplary reliability extracting circuit and an IFFT input selecting circuit.

FIG. 11 illustrates an exemplary reliability extracting circuit 21 and an exemplary IFFT input selecting circuit 32. The reliability extracting circuit 21 illustrated in FIG. 11 includes a power calculating circuit 91, a power calculating circuit 92, a difference calculating circuit 93, a absolute value calculating circuit 94, a threshold value calculating circuit 95, and a threshold value supplying circuit 96. The IFFT input selecting circuit 32 includes a carrier selecting circuit 101, a selecting circuit 102, a delay circuit 103, and a selecting circuit 104.

For example, the power calculating circuit 91 may receive the hard-decision results from the hard-decision processing circuit 20 illustrated in FIG. 3, and calculate a sum of the square of a real part I and the square of an imaginary part Q of the hard-decision results, thereby determining a signal power value. The power calculating circuit 92 receives the equalized data signal from the division processing circuit 14B, and sums the square of a real part I and the square of an imaginary part Q of the equalized data signal, thereby determining a signal power value. The difference calculating circuit 93 calculates a difference between the signal power value determined by the power calculating circuit 91 and the signal power value determined by the power calculating circuit 92. The absolute value calculating circuit 94 determines the absolute value of the difference determined by the difference calculating circuit 93. The absolute value may be an index indicating the reliability of the hard-decision process. Alternatively, the difference calculating circuit 93 determines a difference based on the square roots of the powers determined by the power calculating circuits 91 and 92. The absolute value of the difference may be a distance between the two signals subsequent to the hard-decision process.

The threshold value calculating circuit 95 compares the absolute value output from the absolute value calculating circuit 94 with a threshold value responsive to the modulation method supplied from the threshold value supplying circuit 96. If the absolute value is higher than the threshold value, the threshold value calculating circuit 95 may output "0." If the absolute value is equal to or lower than the threshold value, the threshold value calculating circuit 95 may output "1." The output of the threshold value calculating circuit 95 may be an index indicating the reliability of the transmission path characteristic value of the data carrier. The modulation method may be identified by decoding the TMCC signal. The shorter the interval between the transmission points subsequent to the modulation, the lower the threshold value responsive to the modulation method. The longer the interval between the transmission points subsequent to the modulation, the higher the threshold value responsive to the modulation method.

The carrier selecting circuit 101 in the IFFT input selecting circuit 32 identifies each carrier in the order of small to larger numbers. The selecting circuit 102 selects the signal of the carrier identified by the carrier selecting circuit 101, and supplies the selected signal to the selecting circuit 104. As for the SP carrier, the signal supplied from the selecting circuit 102 may be the signal of a received carrier. As for the data carrier, the AC carrier, and the TMCC carrier, the signal supplied from the selecting circuit 102 may be a signal that has been divided by the division processing circuit 30. The signal supplied from the selecting circuit 102 may be the transmission path characteristic value of each carrier.

In response to the reliability value output from the reliability extracting circuit 21, the selecting circuit 104 selects between the transmission path characteristic value of the carrier supplied from the selecting circuit 102 and the transmission path characteristic value of the carrier preceding by one carrier supplied from the delay circuit 103. The transmission path characteristic value of the carrier may be the transmission path characteristic value of the carrier presently selected by the carrier selecting circuit 101. The transmission path characteristic value of the carrier preceding by one carrier may be the transmission path characteristic value selected for the carrier preceding by one carrier from the carrier presently selected by the carrier selecting circuit 101. If the reliability value is "1," the transmission path characteristic value of the carrier is considered reliable, and the transmission path characteristic value of the carrier supplied from the selecting circuit 102 is selected. For example, if the reliability value is "0," the transmission path characteristic value of the carrier is not considered reliable, and the previous transmission path characteristic value supplied from the delay circuit 103 is selected. The reliability value supplied from the reliability extracting circuit 21 may be set to be "1," if the carrier presently selected by the carrier selecting circuit 101 is not a data carrier.

Since a modulation method is the DBPSK modulation in the AC carrier and the TMCC carrier so that the AC carrier and the TMCC carrier are robust to noise and a number of pieces of substantially identical information are inserted into a plurality of carriers, a high reliability transmission path characteristic value is obtained. In the data carrier, the modulation method may be one of QPSK, 16 QAM, and 64 QAM, and an unknown value may be transmitted on each carrier. The IFFT input selecting circuit 32 selects a data signal in response to the reliability determined by the reliability extracting circuit 21, and outputs a data carrier having a high reliability. The IFFT circuit 33 arranged next to the IFFT input selecting circuit 32 inverse fast Fourier transforms a signal string including the SP signal, the AC signal, the TMCC signal, and the data signal having a high reliability. The signals to be inverse fast Fourier transformed are arranged in the order of carrier numbers. A previously selected signal is used at a position of a carrier having a low reliability. Information having a low reliability may be excluded from the operation of IFFT.

Figure 12:
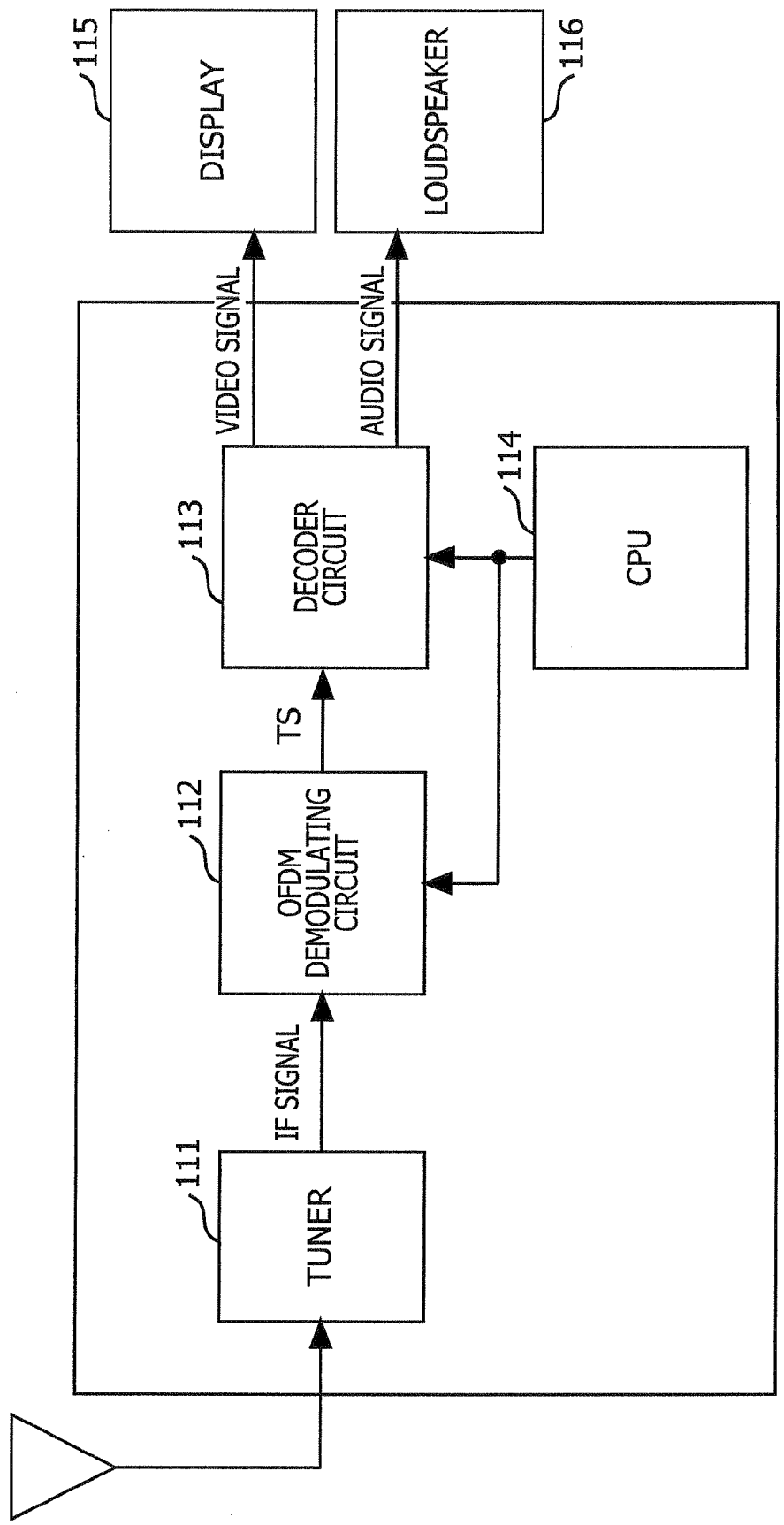
FIG. 12 illustrates an exemplary receiving system.

FIG. 12 illustrates an exemplary receiving system. The receiving system illustrated in FIG. 12 includes tuner 111, OFDM demodulating circuit 112, decoder circuit 113, CPU 114, display 115, and loudspeaker 116. The tuner 111 receives a signal received via an antenna, and outputs an intermediate frequency (IF) signal. The OFDM demodulating circuit 112 receives the IF signal from the tuner 111, and outputs an OFDM demodulated digital signal as a transport stream TS. The tuner 111 and the OFDM demodulating circuit 112 may correspond to the demodulating circuit illustrated in FIG. 2. The decoder circuit 113 receives the transport stream TS from the OFDM demodulating circuit 112, and decodes the transport stream TS. The decoder circuit 113 thus generates an output signal containing a video signal and an audio signal. The CPU 114 controls the OFDM demodulating circuit 112 and the decoder circuit 113. The display 115 outputs an image in response to the video signal. The loudspeaker 116 outputs an audio in response to the audio signal.

The previous embodiment may be applied to Japanese Standards for digital terrestrial broadcasting, Integrated Services Broadcasting-Terrestrial (ISDB-T). The previous embodiment may be applied to an OFDM modulation and demodulation system in an multi-path environment, or an environment similar to the multi-path environment.

Example embodiments of the present invention have now been described in accordance with the above advantages. It will be appreciated that these examples are merely illustrative of the invention. Many variations and modifications will be apparent to those skilled in the art.

The invention claimed is:
1. A demodulating circuit, comprising:
a fast Fourier transform circuit which fast Fourier transforms a received signal and outputs a plurality of carrier signals;
an output selecting circuit which selects at least two signals from the plurality of carrier signals, the at least two signals including a first signal modulated in accordance with a first modulation method and a second signal modulated in accordance with a second modulation method;

an inverse fast Fourier transform circuit which inverse Fourier transforms transmission path characteristic values including a first transmission path characteristic value obtained based on the first signal and a second transmission path characteristic value obtained based on the second signal; and a FFT window control circuit which controls a position of a FFT window based on the inverse Fourier transformed transmission path characteristic values.

2. The demodulating circuit according to claim 1, wherein the at least two signals include a third signal modulated in accordance with a third modulation method, and wherein the inverse Fourier transformed transmission path characteristic values include a third transmission path characteristic obtained based on the third signal.

3. The demodulating circuit according to claim 1, wherein the first modulation method includes a binary phase shift keying modulation method, and wherein a number of modulated signal points on a complex plane subsequent corresponding to the second modulation method is larger than a number of signal points corresponding to the first modulation method.

4. The demodulating circuit according to claim 2, wherein the third modulation method includes a differential binary phase shift keying modulation method, and wherein the third transmission path characteristic value is determined based on the third signal, a signal obtained by differential binary phase-shift keying (DBPSK) demodulating the third signal and a pseudo-random bit string.

5. The demodulating circuit according to claim 1, comprising:

a reliability extracting circuit which outputs a reliability of the second transmission path characteristic value; and an input selecting circuit which selects the second transmission path characteristic value in response to the reliability, wherein the inverse Fourier transform circuit inverse Fourier transforms the second transmission path characteristic value selected by the input selecting circuit.

6. The demodulating circuit according to claim 5, wherein the reliability extracting circuit calculates the reliability in response to a difference between a signal obtained by hard-decision of the second signal and a signal prior to the hard decision.

7. The demodulating circuit according to claim 1, wherein the first signal includes a reference signal for demodulation, and wherein the second signal includes a data signal.

8. A method, implemented in a demodulating circuit, comprising:

generating a plurality of carrier signals by fast Fourier transforming a received signal;

extracting a first signal modulated in accordance with a first modulation method and a second signal modulated in accordance with a second modulation method from the plurality of carrier signals;

inverse Fourier transforming transmission path characteristic values including a first transmission path characteristic value obtained based on the first signal, and a second transmission path characteristic value obtained based on the second signal; and controlling a position of a fast Fourier transform window based on the inverse Fourier transformed transmission path characteristic values.

9. The method according to claim 8, further comprising:

selecting from the plurality of carrier signals a third signal modulated in accordance with a third modulation method, wherein the inverse Fourier transformed transmission path characteristic values include a third transmission path characteristic value obtained based on the third signal.

10. The method according to claim 8, further comprising:

calculating a reliability of the second transmission path characteristic value; and selecting the second transmission path characteristic value in response to the reliability, wherein the inverse Fourier transformed transmission path characteristic values includes the selected second transmission path characteristic value.

11. The method according to claim 10, wherein the reliability is calculated based on a different between a signal obtained by a hard decision of the second signal and a signal prior to the hard decision.

12. A receiving system, comprising:

a tuner which receives a signal and outputs an intermediate frequency signal;

a demodulating circuit which receives the IF signal and outputs a digital signal;

a decoder which receives the digital signal and generating an output signal;

a control circuit which controls the demodulating circuit and the decoder; and an output circuit which outputs the output signal, wherein the demodulating circuit includes:

a fast Fourier transform circuit which fast Fourier transforms a received signal and outputs a plurality of carrier signals;

an output selecting circuit which selects at least two signals from the plurality of carrier signals, the at least two signals including a first signal modulated in accordance with a first modulation method and a second signal modulated in accordance with a second modulation method;

an inverse fast Fourier transform circuit which inverse Fourier transforms transmission path characteristic values including a first transmission path characteristic value obtained based on the first signal and a second transmission path characteristic value obtained based on the second signal; and a FFT window control circuit which controls a position of an FFT window based on the inverse Fourier transformed transmission path characteristic values.

13. The receiving system according to claim 12, wherein the at least two signals include a third signal modulated in accordance with a third modulation method, and wherein the inverse Fourier transformed transmission path characteristic values include a third transmission path characteristic value obtained based on the third signal.

14. The receiving system according to claim 12, wherein the first modulation method includes a binary phase shift keying modulation method, and wherein a number of modulated signal points on a complex plane corresponding to the second modulation method is larger than a number of signal points corresponding to the first modulation method.

15. The receiving system according to claim 13, wherein the third modulation method includes a differential binary phase shift keying modulation method, and wherein a third transmission path characteristic value is determined based on the third signal, a signal obtained by demodulating the third signal, and a pseudo-random bit string.

16. The receiving system according to claim 12, comprising:
- a reliability extracting circuit which outputs a reliability of the second transmission path characteristic value; and
- an input selecting circuit that selects the second transmission path characteristic value in response to the reliability,
- wherein the inverse Fourier transform circuit inverse Fourier transforms the transmission path characteristic values including the second transmission path characteristic value selected by the input selecting circuit.

17. The receiving system according to claim 16, wherein the reliability extracting circuit calculates the reliability in response to a difference between a signal obtained by a hard decision of the second signal and a signal prior to the hard decision.

18. The receiving system according to claim 12, wherein the first signal includes a reference signal for demodulation, and wherein the second signal includes a data signal.

* * * * *